United States Patent [19]

Kunz et al.

[11] Patent Number: 4,507,542
[45] Date of Patent: Mar. 26, 1985

[54] IMPULSE WELDING DEVICE FOR GAS SHIELDED ARC WELDING

[75] Inventors: Werner Kunz, Duesseldorf; Theo Broeckels, Krefeld, both of Fed. Rep. of Germany

[73] Assignee: Kohlensaeurewerk GmbH, Bad Hoenningen, Fed. Rep. of Germany

[21] Appl. No.: 488,585

[22] Filed: Apr. 25, 1983

[30] Foreign Application Priority Data

May 7, 1982 [DE] Fed. Rep. of Germany ...... 3217093

[51] Int. Cl.³ .............................................. B23K 9/09
[52] U.S. Cl. ......................... 219/130.51; 219/137 PS
[58] Field of Search ...................... 219/130.51, 137 PS

[56] References Cited

U.S. PATENT DOCUMENTS

| 3,409,756 | 11/1968 | Manz | 219/137 PS |
| 3,459,920 | 8/1969 | Sevenco | 219/137 PS |
| 3,809,853 | 5/1974 | Manz | 219/137 PS |
| 4,246,465 | 1/1981 | Ericsson | 219/130.51 |

FOREIGN PATENT DOCUMENTS

| 257729 | 3/1913 | Fed. Rep. of Germany | 126/247 |
| 52-71356 | 6/1977 | Japan | 219/130.51 |
| 55-93070 | 7/1980 | Japan | |
| 1335703 | 10/1973 | United Kingdom | 24/102 R |
| 1403995 | 8/1975 | United Kingdom | 187/58 |

OTHER PUBLICATIONS

J. C. Needham, "Pulsed Current for Gas Shielded Arc Welding", IEEE Transactions on Industry and General Applications, vol. IGA-2, No. 3, May-Jun. 1966.

Primary Examiner—Clifford C. Shaw
Attorney, Agent, or Firm—Schwartz, Jeffery, Schwaab, Mack, Blumenthal & Koch

[57] ABSTRACT

The impulse welding device includes a transistor circuit which is operated by an impulse generator. The power transistors of the transistor circuit are operated alternately in the blocked condition and in the conducting condition. The transistor circuit is connected to a direct current power source in series with the arc which is created between the welding electrode and the work piece to be welded. The transistor circuit is shunted by an ohmic resistor which allows a spacing current to flow through the ignited arc during the impulse pauses. Since the power transistors are substantially completely blocked during the impulse pauses, the power loss will be decreased.

12 Claims, 2 Drawing Figures

IMPULSE WELDING DEVICE FOR GAS SHIELDED ARC WELDING

BACKGROUND OF THE INVENTION

The present invention concerns an impulse welding device for gas shielded arc welding having a transistor circuitry which is supplied from a D.C. power source, which contains a power transistor and which is controlled by an impulse generator, whereby the welding electrode is supplied with a welding current which changes impulse-wise between a low current level and a high current level.

Electric gas shielded arc welding can be performed using either direct current or pulsating current. Welding with pulsating current has the advantage of a smaller power consumption; however, attention must be paid to the fact that, during the impulse pauses, the current will not be completely shut off but will flow as a spacing or holding current with a low amperage, so that the arc existing between the work piece and electrode will not cease. The current impulses during impulse welding have a repetition frequency between 25 and 100 Hz. The intensity of the current to be connected has a value of from about 600 to 700 A. During the impulse pauses, a spacing current of about 100 A flows. In principle, thyristors can be used as power switches for producing the impulses. However, thyristors which are suitable for circuitry at such high power levels cause switching hesitations by means of which the rectangular impulse wave form is rounded-off. Rectangular impulses with steep impulse trailing edges are needed to maintain the arc. Suitable for generation of these rectangular impulses are transistors which have faster switching behavior than thyristors. A plurality of power transistors connected in parallel are used in the known impulse welding devices. These transistors are synchronously controlled by an impulse source and are alternately switched between a state of a higher conductivity and a state of a lower conductivity. In the lower conductivity state, a spacing current of about 100 A flows through the transistor circuitry and through the arc, whereas in the high conductivity state, the impulse current is, e.g., 700 A. The intensity of this pulsating current is generally determined by the voltage of the D.C. power source, to which the series connection from the transistors and from the arc is connected. At the high current level the transistors are fully conducting, so that there is only a small power loss. At the low current level, on the other hand, the transistors are switched into a condition where they are partially conductive. In this condition, the power transistors are under high voltage, and at the same time a charge current flows through them. This means that the transistors have a relatively high power loss and are heated to considerable temperatures. Therefore, the transistor circuitry of the known impulse welding devices requires extensive water cooling.

The high power loss of the power transistors has the consequence that the known impulse welding devices are designed so as to be very heavy and expensive, and the pulsating component is at all times structurally united with the direct current supply component. In particular, there are no accessory devices which can be operated in connection with direct current welding systems, in order that these direct current welding systems could also be used for impulse welding.

It has been also known to produce an impulse welding current by connecting to the welding circuit a mechanical switch or commutator to which a current limiting resistor is connected in parallel (IEEE Transactions on Industry and General Applications, Vol. IGA-2, No. 3, May/June 1966, pages 225–227).

After all, there has been known an impulse welding device (JA-A-75-19163) which contains in the welding circuit a first series connection of a switching transistor, and an inductivity, as well as in parallel thereto, a second current path of a current limiting resistor and another inductivity. The current transistor is periodically switched to the ON and OFF condition by the pulse generator. The resultant welding current is formed by a train of pulses which are worn off by the inductivities. In particular at the rear slopes of the welding pulses, the formed current intrusions may cause interruptions of the welding arc.

SUMMARY OF THE INVENTION

It is therefore an object of the present invention to provide an improved impulse welding device.

It is a further object of the invention to provide an impulse welding device wherein the transistor circuitry is designed for a considerably lower power consumption than those of the known impulse welding devices.

It is another object of the invention to provide an impulse welding device wherein it is ensured that no breakdown of the welding arc occurs at the rear sides of the welding pulses and that a proper creation of welding droplets is achieved.

A particular object of the invention is to provide an impulse welding device wherein the cooling consumption of the transistor circuitry will be reduced.

In accomplishing the foregoing objects, there has been provided in accordance with the present invention an impulse welding device suitable for gas-shielded arc welding comprising a welding electrode, a direct current power source, a first current path comprising a transistor circuit supplied by said power source and including a plurality of power transistors, said transistor circuit connected to said welding electrode for providing an arc welding current thereto, an impulse generator for periodically driving the power transistors of said transistor circuit between a low conduction state and a high conduction state such that a pulsating arc welding current, having high and low amplitudes, is provided to said welding electrode, and a second current path comprising at least one substantially pure ohmic resistor having negligible inductive reactance, connected in parallel with said plurality of power transistors and connected in series with said direct current power source and said welding electrode, said first current path and said second current path being free of any substantial inductive reactance, whereby said low amplitude current of said pulsating arc welding current is passed through said ohmic resistor at least when said plurality of said transistors are in the low conduction state. Preferably, the impulse generator, the transistor circuit and the resistor are provided in a separate device which is interconnected with the direct current power source.

Further objects, features and advantages of the present invention will become apparent from the detailed description of preferred embodiments which follows, when considered with the attached drawings.

DETAILED DESCRIPTION OF PREFERRED EMBODIMENTS

Figure 1:
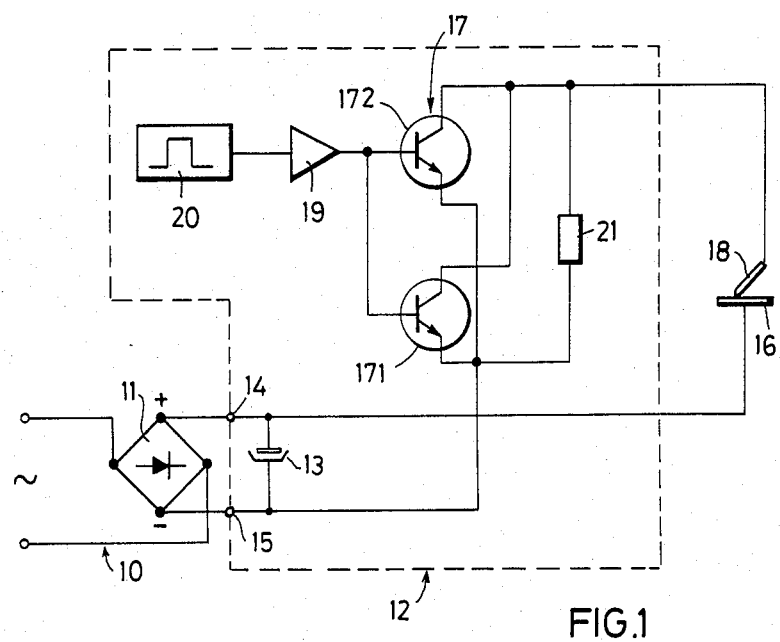
FIG. 1 is a schematic diagram of the circuitry of the impulse welding device according to the invention.

According to the invention, the power transistors of the transistor circuitry are placed into the blocking condition at the lower value of the welding current, and, connected in parallel with the power transistors is at least one ohmic resistance which constantly passes a current having a value corresponding to the lower current value.

In the impulse welding device according to the invention, the power transistors are placed into the blocking condition during the impulse pauses in which the spacing current flows at the lower current value. This way, it is possible to utilize switching transistors, which are switched only between the blocking condition and conducting condition. During the impulses, the currents of the power transistors are added to the spacing current. Since the power transistors are switched into the blocking condition in the impulse pauses, they have flowing therethrough only a very small residual current, so that the power loss in the blocking condition is very small. Therefore, the power transistors do not need any water cooling, and air cooling is sufficient. This has the result that the impulse component of an impulse welding device can be built small and with a relatively light weight as an add-on device for a direct current power source or for a direct current power component. This way it is possible to equip the known direct current welding systems with the add-on device in order that they can be used for impulse welding. For this purpose, in accordance with a preferred embodiment of the invention, the impulse generator, the transistor circuit, the resistor and, optionally, a bank of capacitors are provided in a separate device which can be connected with the direct current power source.

In order to maintain the rectangular form of the current impulses produced by the transistor circuitry, it is important that the resistor connected in parallel with the transistor circuitry is a purely ohmic resistance. Because of the high current intensity, especially the inductive components of the resistor have a disadvantageous influence on the form of the electrical impulses. Therefore, the resistor should have a bifilar winding, i.e., it should be divided into a plurality of oppositely wound winding parts, so that the inductances of the single winding parts compensate for each other.

The impulse repetition frequency with which the transistor circuit is operated and the impulse-pause-ratio are preferably adjusted so that it is possible to work with shielding gases having a high $CO_2$-content and small content of noble gases, without the arc ceasing.

The invention will be explained in further detail with reference to a preferred embodiment illustrated in the drawings.

According to FIG. 1, there is provided a direct current power souce 10, which is supplied with an alternating current and contains a transformer (not shown) and a bridge rectifier 11. The direct current power source 10 delivers a constant voltage at its output. This may be, e.g., a direct current power source of the conventional type of construction.

The device 12 which produces a pulsating type welding current is attached to the output of the direct current power source 10. This device 12 includes between the positive pole 14 and the negative pole 15 of the supply voltage a bank of condensors 13 for current smoothing. The positive pole 14 is attached to the work piece 16 which is to be welded, whereas the negative pole is attached to the emitters of the power transistors 171, 172. The transistor circuit 17 contains a plurality of parallel-connected power transistors, of which only the two power transistors 171, 172 are shown in the drawing. The collectors of all power transistors are interconnected, and are attached to the welding electrode 18. The bases of the power transistors 171, 172 are operated by the impulse generator 20 through an amplifier 19. The impulse generator 20 delivers impulses with a selectable repetition frequency between 50 and 300 Hz. The power transistors 171, 172 are switched into the conductive condition by the impulses, whereas the power transistors are completely blocked during the impulse pulses. In case it is required for blocking, a potential can be applied to the bases of the power transistors which still lies below the negative potential existing at the emitters, but at most a potential which is equal to the potential at the emitters.

The resistor 21 is connected in parallel to the power transistors 171, 172. This resistor is connected with the emitters on one side, and with the collectors of the power transistors on the other side. It consists of a bifilar wire coil and has a resistance value of, e.g., 0.4 ohms. The resistor 21 is thus connected in series with the arc, created between the welding electrode 18 and the base material 16, and the terminals 14 and 15, so that the current flows constantly through the resistance 21 while the arc is ignited. It is assumed that the current intensity which flows through the resistor 21 amounts to 100 A.

The value of the resistor 21 can be changed in steps, in order to be able to vary the intensity of the spacing current.

Figure 2:
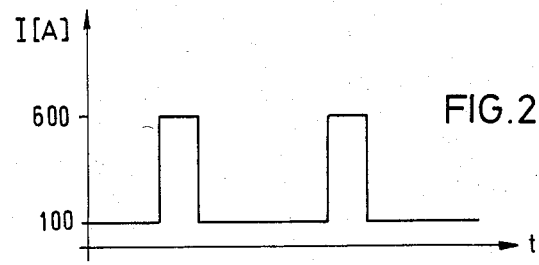
FIG. 2 is a graph showing the passage of the welding current as a function of time.

FIG. 2 shows the current diagram of the welding current I as a function of the time t. A spacing current of 100 A flows during the impulse pauses, i.e. when the power transistors are in the blocked condition. During the impulses i.e. in the conducting condition of the power transistors, the total current intensity of the welding current increases up to 600 A.

What is claimed is:

1. An impulse welding device suitable for gas-shielded arc welding in connection with a direct current power source, comprising:
    a welding electrode;
    a first current path comprising a transistor circuit supplied by said power source and including a plurality of power transistors, said transistor circuit connected to said welding electrode for providing an arc welding current thereto;
    an impulse generator for periodically driving the power transistors of said transistor circuit between a low conduction state and a high conduction state such that a pulsating arc welding current having high and low amplitudes, is provided to said welding electrode; and
    a second current path comprising at least one substantially pure ohmic resistor having negligible inductive reactance connected in parallel with said plurality of power transistors and connected in series with said direct current power source and said welding electrode, said ohmic resistor comprising a bifilar winding, said first current path and said second current path being free of any substantial inductive reactance, whereby said low amplitude current of said pulsating arc welding current is passed through said ohmic resistor at least when said plurality of said transistors are in the low conduction state.

2. An impulse welding device as recited in claim 1 wherein the impulse generator, the transistor circuit and the resistor are provided in a separate device which is interconnected with the direct current power source.

3. An impulse welding device as recited in claim 2 wherein said separate device further includes at least a capacitor connected in parallel with said direct current power source.

4. An impulse welding device as recited in claim 1 further comprising at least one capacitor connected in parallel with said power source.

5. An impulse welding device as recited in claim 4 wherein said plurality of transistors of said transistor circuit are connected in parallel.

6. An impulse welding device as recited in claim 1 wherein said direct current power source includes means for rectifying an alternating current provided thereto.

7. An impulse welding device as recited in claim 6, wherein said plurality of transistors of said transistor circuit are connected in parallel.

8. An impulse welding device as recited in claim 1 wherein said low amplitude current of said pulsating arc welding current is substantially continuously passed through said ohmic resistor during operation of said welding device.

9. An impulse welding device as recited in claim 8 wherein said plurality of transistors of said transistor circuit are connected in parallel.

10. An impulse welding device as recited in claim 1 wherein said plurality of transistors of said transistor circuit is connected in parallel.

11. An impulse welding device as recited in claim 1 wherein the emitters of the transistors are connected to one pole of the direct current source and the collectors of the transistors are connected to the welding electrode whereby the transistors are operated in the emitter circuit.

12. An impulse welding device as recited in claim 1 wherein said power transistors conduct only a residual current while said power transistors are driven in said low conduction state.

* * * * *